United States Patent [19]

Touchton et al.

[11] Patent Number: 5,533,469
[45] Date of Patent: Jul. 9, 1996

[54] PROGRAMMING APPARATUS FOR PROGRAMMABLE ANIMAL CONTROL DEVICE

[75] Inventors: Scott F. Touchton, Malvern, Pa.; Donald L. Peinetti, Lakeside, Calif.; William J. Duffy, Jr., Downingtown, Pa.

[73] Assignee: Invisible Fence Company, Inc., Malvern, Pa.

[21] Appl. No.: 295,380

[22] Filed: Aug. 24, 1994

Related U.S. Application Data

[63] Continuation-in-part of Ser. No. 182,489, Jan. 14, 1994, Pat. No. 5,435,271, which is a continuation-in-part of Ser. No. 182,604, Jan. 14, 1994, Pat. No. 5,476,729, which is a continuation-in-part of Ser. No. 107,868, Aug. 18, 1993, Pat. No. 5,445,900, which is a continuation-in-part of Ser. No. 109,132, Aug. 19, 1993, Pat. No. 5,425,330, said Ser. No. 182,489.

[51] Int. Cl.$^6$ .............................. A01K 3/00; A01K 15/00
[52] U.S. Cl. .......................................... 119/721; 119/908
[58] Field of Search ...................................... 119/720, 721, 119/859, 908

[56] References Cited

U.S. PATENT DOCUMENTS 4,898,120  2/1990  Brose ........................ 119/721
4,967,695  11/1990  Guinta ....................... 119/721
5,353,744  10/1994  Custer ..................... 119/721 X

*Primary Examiner*—Robert P. Swiatek
*Attorney, Agent, or Firm*—Dann, Dorfman, Herrell and Skillman

[57] ABSTRACT

A portable programming apparatus is employed for a programmable animal control device carried by an animal having a receiver for receiving a radio signal, a transducer for applying a stimulus to the animal in response to the radio signal, and a programmable controller responsive to selected control parameters for controlling operation of the animal control device. The programming apparatus includes a connector probe for insertion into a battery compartment of the animal control device. The connector probe includes probe terminals for mating with the battery terminals of the animal control device. The programming apparatus includes a controller for establishing communication with the animal control device via the probe terminals and for transferring the control parameter between the programming apparatus and the animal control device. The programming apparatus includes a parameter selection actuator for selecting a new value of the control parameter and a selection entry actuator for causing the controller to transmit the new value of the control parameter to the animal control device via the probe terminals thereby enabling the animal control device to operate under the new value of the control parameter such as a new frequency of operation.

21 Claims, 4 Drawing Sheets

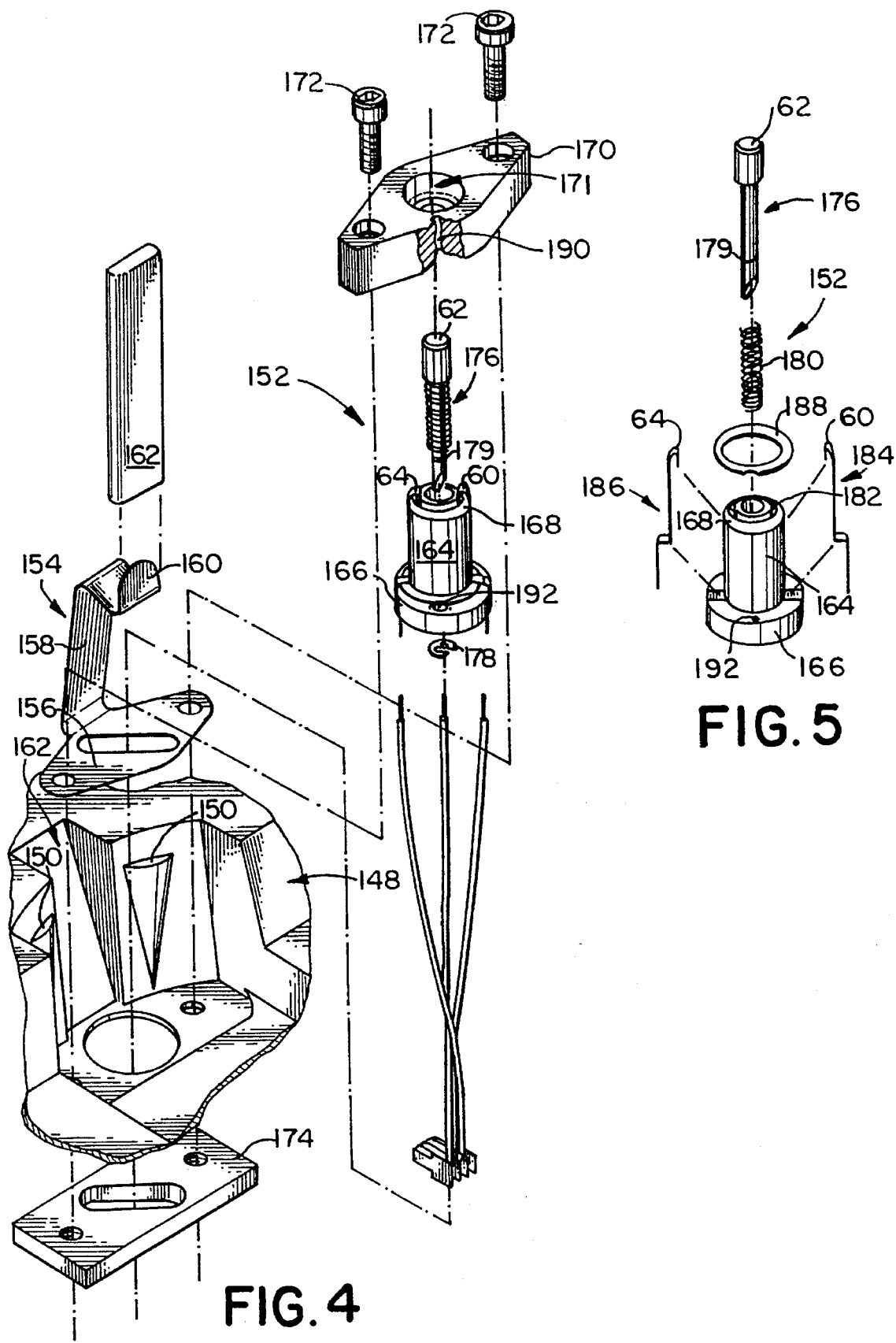

PROGRAMMING APPARATUS FOR PROGRAMMABLE ANIMAL CONTROL DEVICE

RELATED APPLICATION

This application is a continuation-in-part of U.S. patent application Ser. No. 08/182,489 (which is hereby incorporated herein by reference), filed Jan. 14, 1994, now issued as U.S. Pat. No. 5,435,271 on Jul. 25, 1995, which in turn is a continuation-in-part of U.S. patent application Ser. No. 08/109,132 (which is hereby incorporated herein by reference), filed Aug. 19, 1993, now issued as U.S. Pat. No. 5,425,330 on Jun. 20, 1995, and this application is a continuation-in-part of U.S. patent application Ser. No. 08/182,604 (which is hereby incorporated herein by reference), filed on Jan. 14, 1994, now issued as U.S. Pat. No. 5,476,729 on Dec. 19, 1995, which in turn is a continuation-in-part of U.S. patent application Ser. No. 08/107,868 (which is hereby incorporated herein by reference), filed on Aug. 18, 1993, now issued as U.S. Pat. No. 5,445,900 on Aug. 29, 1995.

FIELD OF THE INVENTION

The present invention relates to a programming apparatus for programming a programmable electronic animal control device by supplying or changing selected control parameters of the animal control device. More particularly, the invention relates to an apparatus for programming a programmable electronic animal control device of the type that is carried by an animal to apply a motivational stimulus to the animal in response to a characteristic radio signal emitted by a transmitter having an antenna defining a selected confinement area.

BACKGROUND OF THE INVENTION

Electronic animal control systems have been employed wherein an animal control device having a radio receiver is carried by an animal, for example, by attachment to the animal collar, in order to detect a signal from a radio transmitter to deliver a selected stimulus, such as an electrical shock or a desired tone, to the animal in response to the received signal. In a typical system, a transmitting antenna in the form of a wire loop antenna from the transmitter is disposed around the periphery of a desired confinement area such as a yard. Whenever the animal approaches the transmitting antenna the animal control device carried by the animal functions to deliver a stimulus, such as an electrical shock, to the animal in order to deter further movement by the animal toward the transmitting antenna, thereby keeping the animal within the desired confinement area.

In conventional systems, separate types of animal control devices have been employed to effect different modes of operation. For example, conventional animal control devices have typically been tuned to a single fixed operational frequency, thereby necessitating that a different animal control device be employed for a different operational frequency. However, radio receivers which may be programmed to perform various operations or functions are now being used. For example, a radio receiver may be programmed to operate at different selected frequencies of operation or may be programmed to provide one level of shock frequency for a small animal and a relatively higher level of shock frequency to a larger animal. While the initial operational settings of the animal control device may be suitable in many applications, it is certainly desirable to provide the capability for the radio receiver to be reprogrammed in the field for different functions or operations. Providing a system that enables radio receivers to be reprogrammed in the field or at a customer location becomes much more efficient than requiring the use of different receivers for different modes of operations or requiring the return of the receiver to a manufacturer or dealer to effect setting adjustment.

SUMMARY OF THE INVENTION

In accordance with the present invention, a programming apparatus is provided for programming a programmable animal control device, such as the type carried on an animal to administer a selected stimulus to the animal in order to control the movement of the animal. The animal control device includes a radio receiver for receiving a radio signal typically transmitted from a transmitting antenna, such as a wire loop antenna which is disposed at a selected confinement area to confine the movement of an animal to a selected area defined by the transmitting antenna. The animal control device includes a transducer for applying a selected stimulus, such as an audible tone or an electrical shock, to the animal in response to the transmitted radio signal. The animal control device also includes programmable control means, such as a processor or controller, which is responsive to selected control parameters for controlling operation of the animal control device.

The programming apparatus for the animal control device includes parameter control means, such as a processor or controller, for storing selected control parameters for controlling operation of the animal control device and for providing stored control parameters to the programmable control means of the animal control device. The control parameters may serve to control various operational characteristics of the animal control device such as frequency of operation or stimulus characteristics. A data communication link is provided to effect communication between the parameter control means of the programming apparatus and the programmable control means of the animal control device to permit data communication and transfer of control parameters therebetween. The data communication link may be in the form of input and output data lines that interconnect the parameter control means with the programmable control means.

Parameter selection means in the form of an actuator or selection switch is provided for the parameter control means to enable the selection of control parameters, such as the frequency of operation of the animal control device or parameters for controlling the administration of a selected stimulus such as an electrical shock to the animal. The parameter control means stores selected control parameters in response to the parameter selection means and provides the selected control parameters to the programmable control means of the animal control device via the data communication link in order to control the operation of the animal control device. For example, a control parameter may be selected to control the frequency of application of an electrical shock to the animal.

A display may be operably connected with the parameter control means to display control parameters stored by the parameter control means. As the parameter selection means is employed to select different control parameters, the newly selected control parameters may be displayed on the display. The display may also be used to display other information such as user prompts or identification numbers.

In operation, the programming apparatus may be portable and include an internal power source. Additionally, a power supply circuit may be provided for operably connecting the internal power source of the programming apparatus with the animal control device so that the power source of the programming apparatus supplies power to the animal control device during data communication and transfer of control parameters between the parameter control means of the programming apparatus and the programmable control means of the animal control device.

A power-conservation circuit may be provided for connection with the power source and with the parameter control means for selectively supplying power within the programming apparatus under control of the parameter control means. For example, the power-conservation circuit may be operably connected with the display so that power is selectively supplied to the display under the control of the parameter control means. In addition, the power-conservation circuit may be operably connected with the power supply circuit so that power is selectively supplied to the animal control device from the power supply circuit under the control of the parameter control means.

In a particular embodiment, the programming apparatus includes a connector probe for insertion into a battery compartment of the animal control device. The connector probe may include probe terminals for mating with battery terminals within the battery compartment of the animal control device. The programming apparatus may include a controller for establishing communication with the animal control device via the probe terminals and for transferring a control parameter to the animal control device in order to control operation of the animal control device in accordance with the control parameter. Selection means may be provided for selecting a new value of the control parameter. Selection entry means then causes the controller to transmit the new value of the control parameter to the animal control device via the probe terminals in order to change the operation of the animal control device.

BRIEF DESCRIPTION OF THE DRAWINGS

The foregoing summary, as well as the following detailed description of the preferred embodiments of the present invention, will be better understood when read in conjunction with the appended drawings, in which:

FIG. 4 is an enlarged exploded fragmentary perspective view of a portion of the programming apparatus of FIG. 3, showing a receptacle for receiving an animal control device; and FIG. 5 is an enlarged exploded perspective view of a connector probe that is positioned within the receptacle of FIG. 4.

DETAILED DESCRIPTION

Figure 1:
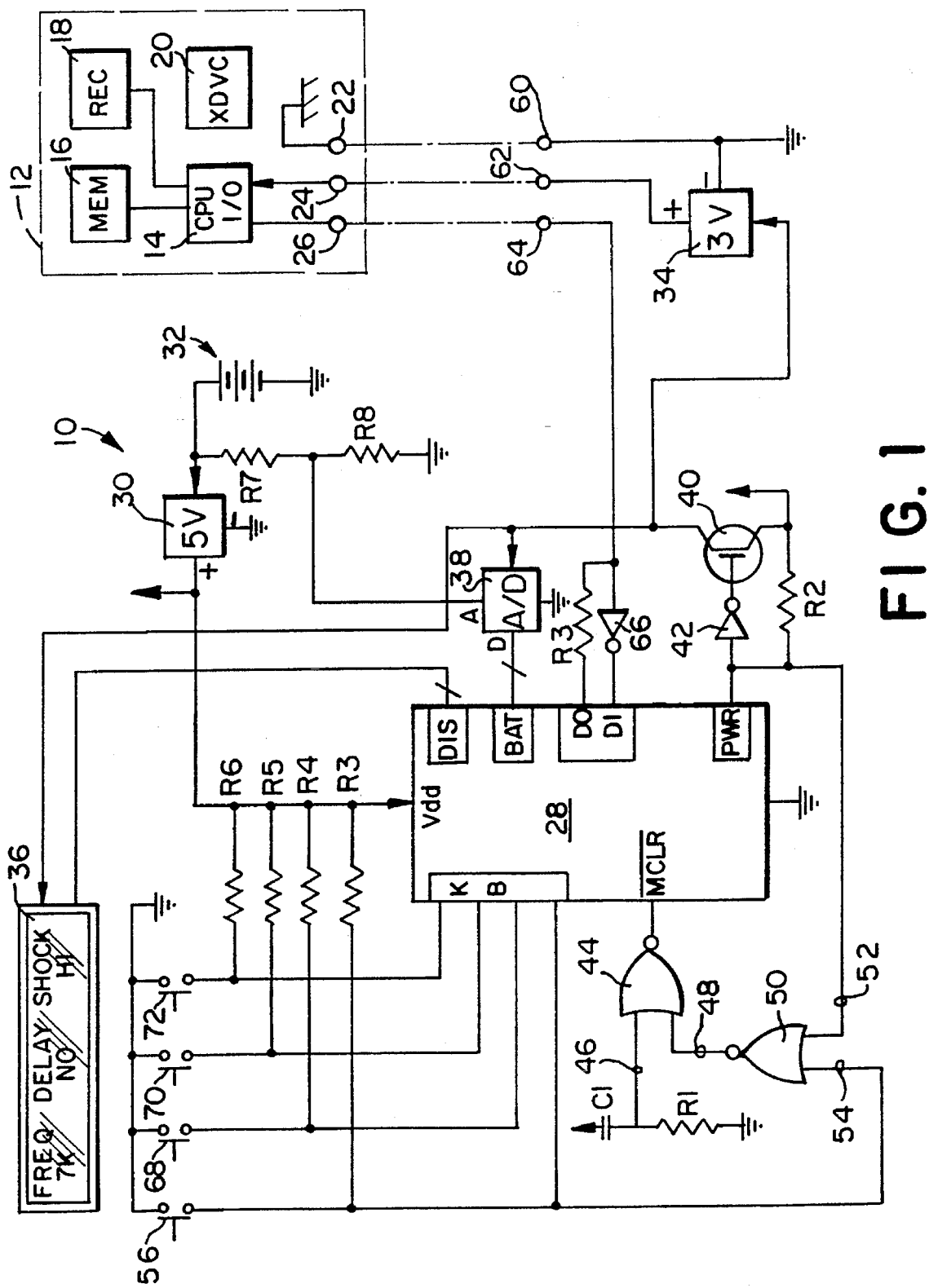
FIG. 1 is a schematic diagram of a programming circuit for a programming apparatus for use in programming an animal control device as shown in functional block diagrammatic form.

Referring now to FIG. 1, there is shown a schematic diagram of a programming circuit 10 and a functional block diagram of an animal control device 12 of the type which is carried by an animal and is responsive to a predetermined transmitted radio signal to provide a selected stimulus to the animal to control the movement of the animal. The animal control device 12 comprises a CPU 14, a memory 16, a receiver circuit 18, and a transducer circuit 20. The receiver circuit 18 is adapted to detect a characteristic radio signal that is emitted by a transmitter antenna defining the boundary of an area in which an animal is to be confined. In response to the detection of a radio signal, the receiver circuit 18 provides a detection signal to the CPU 14. The CPU 14 analyzes the detection signal to verify that the received radio signal corresponds to the expected characteristic signal from the boundary antenna. If the detected signal possesses a predetermined characteristic, such as a particular modulation characteristic, then the CPU 14 operates the transducer circuit 20 in order to apply a selected motivational stimulus, such as an electrical shock and/or a desired tone, to the animal.

The animal control device may be of the type disclosed in U.S. application Ser. No. 08/182,489 filed on Jan. 14, 1994, now issued as U.S. Pat. No. 5,435,271 on Jul. 25, 1995 which is hereby incorporated herein by reference, and disclosed in U.S. patent application Ser. No. 08/182,604, filed on Jan. 14, 1994, now issued as U.S. Pat. No. 5,476,729 on Dec. 19, 1995 which is hereby incorporated herein by reference. A particular embodiment of the animal control device may be a type of animal control device marketed by Invisible Fence Company, Inc. of Malvern, Pa., under Model No. R21.

The operation of the animal control device 12 is controlled by the CPU 14 in accordance with control parameters that are stored within its memory 16. For example, such parameters may include a control value for selecting the operating frequency of the receiver 18, and other control values for selecting the type or amount of stimulation that is to be applied to the animal. During operation of the animal control device 12, the CPU 14 selects the operating frequency of the receiver 18 in accordance with the selected frequency control value. When the proper radio signal is detected, the CPU 14 operates the transducer circuit 20 in accordance with the selected type of stimulation. For example, the transducer 20 preferably includes an audio transducer for producing an audio stimulus, and a shock circuit for applying an electric shock to the animal. Depending upon the control parameters stored in the memory 16, the CPU 14 may first operate the audio transducer for a predetermined delay period. If the proper radio signal is still detected after the delay period, the CPU 14 may then operate the transducer to apply an electric shock to the animal. Alternatively, the CPU 14 may operate the transducer to apply an electric shock upon detection of the proper radio signal without a delay.

The intensity of the electric shock applied to the animal is determined by another control parameter stored in the memory, which indicates a selected shocking frequency. The intensity of the shock stimulus depends upon the rate at which individual shocks are applied to the animal. For example, individual shocks may be applied at frequencies of 100 Hz, 60 Hz, 30 Hz, and 10 Hz to provide respective low, medium-low, medium-high, and high shocking intensities. Other types of control parameters may also be utilized to control other selected operational features of the animal control device 12.

During operation of the animal control device 12, a battery is connected within a battery compartment so that the negative terminal of the battery is in contact with the ground terminal 22 of the animal control device 12. Additionally, the positive terminal of the battery is maintained in contact with terminal 24 and with terminal 26 of the animal control device 12. Terminal 24 of the animal control device 12 is connected to power supply circuitry within the animal control device 12. Terminal 26 of the animal control device 12 is connected with the CPU 14, so that the CPU 14 can determine whether the battery has been removed.

The CPU 14 is programmed to recognize a condition for programming and/or data transmission wherein terminal 24 is connected with a positive voltage and wherein terminal 26 is maintained at a low logic level. Upon detecting such a condition, the CPU 14 then prepares to communicate with the programming circuit 10 of the programming apparatus 130. The programming circuit 10 includes a microcontroller 28, preferably a PIC 16C57 microcontroller, manufactured by Microchip Technology Inc., of Chandler, Ariz. Operating power is supplied to the microcontroller 28 by a voltage regulator 30 that provides a regulated supply voltage of 5 volts. The regulator 30, in turn, is powered by a battery 32 which is preferably a 9-volt battery.

The programming circuit 10 further includes a 3-volt regulator 34 for supplying operating power to the animal control device 12, an LCD Display 36 for providing the user with displayed information, and an analog-to-digital converter for monitoring the voltage of the battery 32. The 3-volt regulator 34, the display 36, and the A/D converter 38 are supplied with operating power from the source terminal of a depletion mode FET 40. The drain terminal of the FET 40 is connected with the 5-volt supply voltage. The gate terminal of FET 40 is connected, via inverter 42, with one of the I/O terminals, designated PWR, of the microcontroller 28. Hence, whenever the microcontroller 28 asserts the PWR terminal, the FET 40 connects each of the LCD 36, the A/D converter 38, and the 3-volt regulator 34, with the 5-volt supply voltage. Whenever the PWR terminal is not asserted, the LCD 36, the A/D converter 38, and the 3-volt regulator 34 are disconnected from the 5-volt power supply. Thus, the microcontroller 28 can selectively apply operating power to other components of the programming circuit 10 so that power can be conserved when the other components are not needed. As such, power-conservation circuitry is thereby provided to selectively control the supply of power to selected components of the programming circuit 10.

Figure 2:
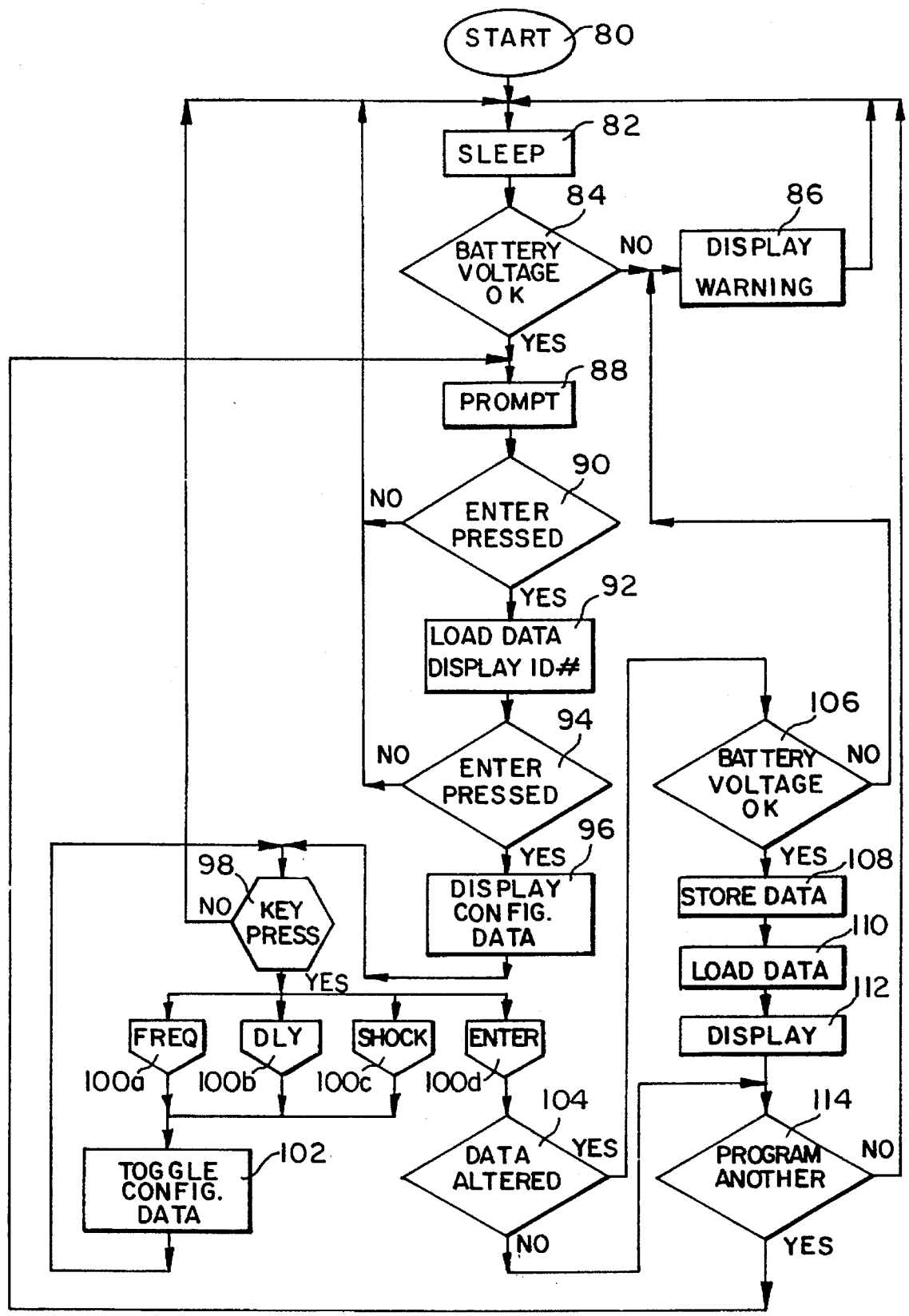
FIG. 2 is a logical flow diagram of the procedure followed by the programming circuit of FIG. 1.

Additional features of the programming circuit 10 will now be described with reference to FIG. 2, wherein there is shown a logical flow diagram of the control procedure executed by the microcontroller 28. When the battery 32 is first connected within the programming circuit 10, and the 5-volt regulator begins to supply power to the microcontroller 28, execution begins at step 80 where the microcontroller 28 initializes internal control registers to establish an input port, designated KB, for receiving keyboard signals; an I/O port, designated BAT, for effecting operation of the A/D converter 38; an output port, designated DIS, for providing data to the display 36; an I/O port, comprising terminals DO and DI, for communicating with the animal control device 12; and the output terminal PWR. Input terminal 46 of NOR gate 44 is connected to a resistor R1 (preferably 100 kΩ) and a capacitor C1 (preferably 0.01 μF). The capacitor C1 is connected to the 5-volt supply voltage, and the resistor R1 is connected to ground. Hence, during any initial transient during connection of the battery in step 80, the input terminal 46 is asserted and an input terminal $\overline{\text{MCLR}}$, a master clear reset terminal, is held low. After the battery has been connected and capacitor C1 has been charged, input 46 is maintained in a low logic condition so that the output of NOR gate 44 is determined by the logical condition of input terminal 48. Then, the microcontroller 28 blanks the LCD 36 and proceeds to step 82.

In step 82, the microcontroller 28 turns off the PWR terminal and executes an instruction which causes the microcontroller 28 to halt execution of the control program and to enter a low power consumption mode of operation, or sleep mode. During the sleep mode, the microcontroller 28 monitors the input terminal designated $\overline{\text{MCLR}}$. As long as $\overline{\text{MCLR}}$ remains high, the microcontroller 28 remains in sleep mode. The logical condition of the $\overline{\text{MCLR}}$ terminal is determined by the output of a NOR gate 44.

Input terminal 48 of NOR gate 44 is connected to the output terminal of NOR gate 50. Input terminal 52 of NOR gate 50 is connected to the PWR terminal of the microcontroller 28 and to a 100 kΩ pull-up resistor R2. Thus, during step 82, the output condition of NOR gate 50, and hence the logical condition of the $\overline{\text{MCLR}}$ terminal, is determined by the logical condition of input terminal 54. Input terminal 54 is connected to a normally-open SPST pushbutton 56. A 100 kΩ pull-up resistor R3 maintains input terminal 54 in a high logic condition when switch 56, hereinafter the ENTER button, is open. When switch 56 is closed, terminal 54 is driven low, thus causing, via NOR gates 50 and 44, the $\overline{\text{MCLR}}$ terminal to also be driven low. The change in the logical condition of the $\overline{\text{MCLR}}$ terminal re-awakens the microcontroller 28, which then proceeds to step 84.

In step 84, the microcontroller 28 determines whether the battery 32 is sufficiently charged to permit prolonged operation of the programming circuit 10. The PWR terminal is asserted in order to turn on FET 40 and to provide power to the 3-volt regulator 34, the A/D converter 38, and the display 36. Then, the microcontroller 28 signals the A/D converter 38, via the BAT port, that the microcontroller 28 is prepared to test the battery voltage. Analog input to the A/D converter 38 is provided by a voltage divider, comprising resistors R7 and R8, connected across the output terminals of the battery 32. Resistor R7 is preferably 2.2 MΩ and resistor R8 is preferably 2 MΩ, so that the voltage divider presents a negligible load upon the battery 32. Additionally, resistors R7 and R8 serve to maintain the maximum analog input voltage to the A/D converter 38 to a level below the 5-volt supply voltage. The A/D converter 38 samples the analog voltage at its input terminal, and provides a digital representation thereof to the BAT port of the microcontroller 28. If the voltage at the input terminal of the A/D converter 38 is determined by the microcontroller 28 to be below 3.33 volts, indicating a battery voltage of 7 volts or less, then execution proceeds to step 86. If, in step 84, the microcontroller 28 determines that the analog input voltage to the A/D converter 38 is above 3.33 volts, then execution proceeds to step 88.

In step 86, the microcontroller 28 causes a warning message to be displayed upon the LCD display 36, indicating that the battery 32 is in need of replacement. Then, having displayed the warning for a predetermined time interval, execution proceeds to step 82. Hence, if the battery voltage is below 7 volts, then the control program will loop through steps 84, 86, and 82 each time that the ENTER button is pressed.

In step 88, the microcontroller 28 causes a greeting to be displayed upon the LCD display 36 and then prompts the user to connect an animal control device to the programming circuit 10. Then, execution proceeds to step 90 while the prompt message remains upon the display 36.

In step 90, the microcontroller 28 executes a timeout loop during which the status of the ENTER button 56 is monitored via the connection between the ENTER button 56 and the KB port of the microcontroller 28. If, during step 90, the ENTER button 56 is not pressed prior to expiration of a predetermined timeout interval, e.g. one minute, then execution returns to step 82.

During step 90, the user is expected to connect an animal control device 12 to the programming circuit 10 so that connection is made between terminals 22, 24, and 26 of the animal control device 12 and respective terminals 60, 62, and 64 of the programming circuit 10. Once these connections have been made, the user is expected to press the ENTER button so that execution proceeds to step 92.

During step 92, the microcontroller 28 pauses for a predetermined timeout interval to receive a message from the animal control device 12 indicating that the animal control device 12 is prepared to communicate with the programming circuit 10. When the programming circuit 10 is properly connected to the animal control device 12, the CPU 14 of the animal control device 12 will, in due course, issue a signal upon terminal 26 that it is ready to communicate. This readiness signal from CPU 14 is received at terminal 64 of the programming circuit 10 and is provided from terminal 64 to the input of an inverter 66. The inverter 66 provides a buffer between the 3 volt logical signals from the animal control device 12 and the 5 volt logical signals used by the microcontroller 28. The output terminal of inverter 66 is connected to the DI terminal of microcontroller 28 to provide the microcontroller 28 with a 5 volt logical representation of the signals received at terminal 64 from the animal control device 12.

Data is retrieved from the animal control device preferably in the form of a serial bit stream in which is encoded the serial number of the animal control device 12, the operating frequency of the receiver 18, the relative shock intensity, a count of stimulations that have been applied to the animal, the number of days since the last battery change, as well as any other information pertinent to the operation of the animal control device 12. When data transmission from the animal control device 12 to the microcontroller 28 has ended, the microcontroller 28 causes the serial number to be displayed upon the LCD 36 and then proceeds to step 94.

In step 94, the serial number of the animal control device 12 continues to be displayed and the microcontroller 28 waits for a predetermined time interval for the ENTER button 56 to be pressed. If, in step 94, the ENTER button 56 is not pressed, then execution returns to step 82. If the ENTER button 56 is pressed during step 94, then execution proceeds to step 96.

In step 96, the microcontroller displays selected configuration data received from the animal control device 12 upon the display 36. The LCD display 36 is preferably a two-line alphanumeric display so that the selected configuration data is displayed as shown in FIG. 1 wherein the type of data (e.g. the operating frequency, the delay setting, and the shock intensity) are listed upon the top line of the display 36. Centered beneath the identification of the type of data on the display 36 is the present value of each data type. For example, the display as shown in FIG. 1 would indicate that the current frequency of operation is 7 kHz, there is no delay prior to shock, and the shock intensity is high. The microcontroller 28 maintains the information displayed upon the display 36 while proceeding to step 98.

In step 98, the microcontroller pauses for a predetermined timeout period until one of the buttons 56, 68, 70, or 72 is pressed. If no button is pressed before the expiration of the timeout period in step 98, then execution returns to step 82. Buttons 68, 70, and 72 are preferably aligned beneath the display so that each of the buttons 68, 70, and 72 is positioned beneath a particular displayed data type. In order to change the displayed value of a given parameter, the user presses the button that is positioned beneath the display of that parameter. For example, the user would press button 68 to alter the operating frequency, button 70 to alter the delay setting, or button 72 to alter the shock intensity. The KB port of the microcontroller 28 is connected with each of buttons 68, 70 and 72. Pull-up resistors R4, R5, and R6 are connected between the 5-volt power supply and each of the terminals of the KB port of the microcontroller 28 in order to maintain a high logic condition at each terminal of the KB port when no button is pressed. Each of the buttons 68, 70, and 72 is preferably a normally-open SPST switch that is connected to ground. When the microcontroller detects that one of buttons 68, 70, or 72 has been pressed, the microcontroller 28 may pause briefly to confirm that one of the buttons has been pressed for a predetermined interval of time in order to provide debouncing. Then, if one of buttons 68, 70, and 72 has been pressed, execution proceeds to one of steps 100a, 100b, and 100c depending upon which of the buttons was pressed.

In each of steps 100a, 100b, and 100c, the parameter that was selected by pressing one of the buttons in step 98 is advanced by one step in a predetermined cycle of possible values. For example, if the displayed operating frequency is 7 kHz, then the microcontroller, in step 100a, may change the value of an internal frequency register from 7 kHz to 10 kHz. In step 100b, the value of a delay flag will be changed from an asserted value to a non-asserted value or vice-versa depending upon the original value of the delay flag. Alternatively, the value of the time delay might be incremented through a series of values by successive actuations of button 70. In step 100c, the shock intensity will be changed from low to medium-low, from medium-low to medium-high, from medium-high to high, or from high to low, depending upon its original value. Of course, additional shock levels could be added. From step 100a, 100b, or 100c, execution proceeds to step 102.

In step 102, the display 36 is then updated to reflect the parameter change that was made in one of step 100a, 100b, or 100c. Then, execution returns to step 98.

If, during step 98, the ENTER button 56 is pressed, then execution proceeds to step 100d. In step 100d, the microcontroller 28 pauses for a predetermined debounce period, and then proceeds to step 104.

In step 104, the microcontroller determines whether any of the configuration parameters have been altered from the original values received from the animal control device 12 during step 92. If, in step 104, it is determined that no alterations have been made, then execution proceeds to step 114. If, in step 104, it is determined that alterations have been made, then execution proceeds to step 106.

In step 106, the microcontroller again operates the A/D converter 38 in order to determine whether there is sufficient battery voltage to proceed to send the new control parameters to the animal control device. The test of step 106 is performed in order to ensure that the programming circuit 10 does not "hang" during communication with the animal control device and hence possibly cause undesirable corruption of the data transmitted to the animal control device. If, in step 106, it is determined that the battery voltage is below a predetermined level, then execution proceeds to step 86. If, in step 106, the battery voltage is determined to be sufficient, then execution proceeds to step 108.

In step 108, the microcontroller 28 pauses to receive at terminal DI, a signal from the animal control device 12 indicating that the animal control device 12 is prepared to receive data from the programming circuit 10. Upon receipt of the readiness signal, the microcontroller 28 then issues, via terminal DO, a reply signal indicating that the microcontroller 28 is prepared to store new configuration parameters to the animal control device 12. Terminal DO of the microcontroller 28 is connected, via a 430 kΩ current-limiting resistor R3, to terminal 64 of the programming circuit. The entire set of configuration parameters are sent to the animal control device as a single serial bit stream in which the configuration parameters are encoded in a predetermined order. After downloading the entire set of configuration parameters, including any new or updated parameters, execution proceeds to step 110.

In step 110, the microcontroller again pauses to receive a signal from the animal control device indicating that it is prepared to transmit data to the programming circuit. Then, the microcontroller 28 issues an acknowledgment signal to the animal control device 12 indicating that the microcontroller 28 is prepared to receive data from the animal control device 12. Then, the animal control device 12 again transmits its configuration data to the microcontroller 28. Then, execution proceeds to step 112.

In step 112, the microcontroller 28 displays the configuration parameters received in step 110 upon the display 36. The microcontroller 28 maintains this display for a predetermined time interval, such as 5 seconds, so that the user can verify that the desired configuration parameters have been properly set within the memory of the animal control device 12. Then, execution proceeds to step 114. After step 112, the user may disconnect the animal control device 12 from the programming circuit 10, replace the battery therein, and then attach the animal control device 12 to an animal. The animal control device will then operate in accordance with the control parameters that were supplied to it during step 108.

In step 114, the microcontroller causes the display 36 to display an appropriate prompting message in order to ask the user whether another animal control device is to be programmed. This prompting message is maintained upon the display 36 for a predetermined timeout interval. If, during the timeout interval, the user presses the ENTER key, then execution returns to step 88. If, during step 114, the user does not press the ENTER key within the timeout interval, then execution returns to step 82.

Figure 3:
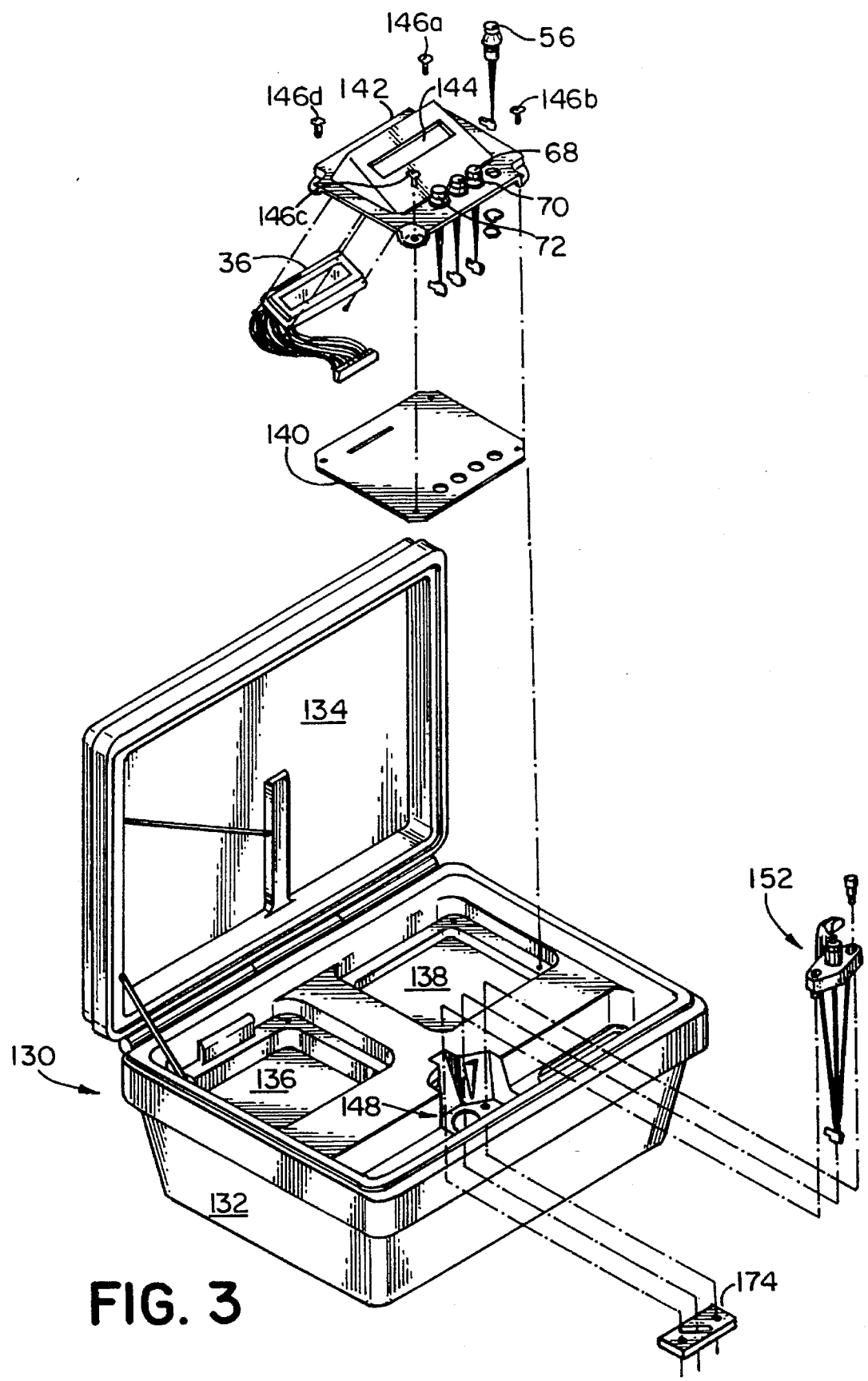
FIG. 3 is an exploded perspective view of a programming apparatus which houses the programming circuit of FIG. 1.

Referring now to FIG. 3, there is shown a portable case 130 for housing the programming circuit 10. The case 130 includes a base 132 and a hinged lid 134. The lid 134 preferably closes upon the base 132 to form a weather-proof seal therebetween.

Within the base portion 132 is an accessory compartment 136 for housing accessories such as maintenance tools, spare batteries, and the like. Adjacent to the accessory compartment 136 is a circuit compartment 138 for housing the programming circuitry 10 and the battery therefor. A bezel mounting plate 140 covers the top of the circuit compartment and supports a bezel 142. The LCD display 36 is mounted to the bezel 142 so that the display 36 is visible through a viewing slot 144 in the bezel 142. The ENTER button 56 is positioned beside buttons 68, 70, and 72 which are mounted onto the bezel so that they are positioned beneath the opening 144 to align with respective information displayed upon the display 36. Appropriate wires and connectors are attached to the display 36 and the buttons 56, 68, 70, and 72 for extending into the circuit compartment for connection with the programming circuitry. The bezel 142 and the bezel mounting 140 are secured to the base portion 132 of the case 130 by screws 146a–d.

A contoured receptacle 148 is centrally located toward the front of the base portion 132 of the case. The receptacle 148 is shaped to receive an animal control device in a predetermined orientation. A connector probe 152 is positioned within the receptacle 148 for extending into an open battery compartment of a mating animal control device when properly placed into the contoured receptacle 148.

Referring now to FIG. 4, the contoured receptacle 148 and the connector probe 152 are shown in greater detail. Extending into the contoured receptacle 148 are projections 150 which serve to orient and align the animal control device as it is lowered into the contoured receptacle 148 and onto the connector probe 152. In the preferred embodiment, the animal control device is longitudinally asymmetric so that when it is placed into the contoured recess and in contact with the guiding projections 150, the battery compartment of the animal control device will align with the probe 152 only if the animal control device is in a predetermined orientation. Such alignment of the animal control device ensures that the terminals within the battery compartment will align with the proper terminals of the probe 152. The probe terminals 152 are maintained within the recess 148 to have a corresponding predetermined alignment. A spring clip 154 is positioned within the contoured receptacle 148 for retaining the animal control device securely upon the connector probe 152. The spring clip 154 comprises a base portion 156 that is generally coextensive with the bottom of the contoured receptacle 148. Projecting upward within the contoured receptacle 148 from the base portion 156 of the spring clip 154 is an elongated strip portion 158 of the spring clip 154. The elongated strip portion 158 of spring clip 154 serves as a spring arm and supports a tab portion 160 of spring clip 154. The tab portion 160 of spring clip 154 is sinuously shaped to urge downwardly upon the animal control device under the bias of spring arm 158 when the animal control device is positioned upon the connector probe. Additionally, the tab portion 160 includes an upward projection that is adapted to fit into a slot in the bottom surface of a lever 162.

In order to position an animal control device upon the connector probe 152, the lever 162 is pressed rearwardly within the contoured receptacle 148 so that the tab portion 160 of spring clip 154 is moved clear of the top of the connector probe 152 against the bias of the spring arm 158. Then, the animal control device is placed within the contoured receptacle and lowered upon the connector probe 152 so that connector probe 152 aligns with and extends into the battery compartment of the animal control device 12. After the animal control device 12 has been properly positioned upon the connector probe, the lever 162 is released so that the tab 160 engages the upper surface of the animal control device and urges the animal control device downwardly onto the connector probe 152. An angular recess slot 162 is located within the contoured receptacle 148 for accommodating rearward deflection of the spring arm 158 of the spring clip 154 when the lever 162 is pressed rearwardly to permit insertion of an animal control device.

The spring clip 154 and the connector probe 152 are assembled within the receptacle 148 so that an enlarged circular base portion 166 of the connector probe rests upon the base portion 156 of the spring clip 154. The connector probe 152 is maintained in position within the contoured receptacle 148 by a retaining member 170. The retaining member 170 has a central countersunk opening 171 for receiving the connector probe 152. The bottom portion of opening 171 is shaped to mate with the base portion 166 of the probe 152 so that the base portion of the probe is captured within the alignment member when the retaining member 170 is secured in position with the bottom of the retaining member being held generally flush against the base 156 of spring clip 152. The connector probe 152 is secured within the receptacle 148 by allen bolts 172 which extend through the retaining member 170, the base portion 156 of spring clip 154, and the bottom of the receptacle 148. The allen bolts 172 screw into a base plate 174 to secure the retaining member 170 against the base portion 156 of the spring clip 154.

The connector probe 152 includes a tubular body 164 projecting upward from the base 166 to provide a mounting post, and a frustro-conical tip 168 at the upward end of the tubular body 164. A central cavity extends through the tubular body 164 and the base 166. A spring-loaded cylindrical conductor 176 is retained within the cavity by a retaining clip 178 which removably fits within an annular slot 179 located toward the bottom of the conductor 176. Spring 180 surrounds the conductor 176 within the central cavity of the probe 152 and is held therein in compression between the enlarged upper tip of conductor 176 and a catch in the form of an inwardly projecting ledge near the bottom of the cavity. The spring 180 serves to establish secure connection between terminal 62 of the programming circuit and terminal 24 of the animal control device 12. The upper surface of conductor 176 provides terminal 62 of the programming circuit 10 of FIG. 1.

Referring now to FIG. 5, the connector probe 152 is shown in greater detail. Terminals 60 and 64 of the programming circuit 10 are provided by the upper surfaces of conductive strips 184 and 186 respectively. The strips 184 and 186 are shaped to conform with the exterior of the connector probe 152 along opposite sides thereof. An annular groove 182 is formed in the upper surface of the frustro-conical tip portion 168 of the connector probe 152. The upper ends of strips 184 and 186 are bent to fit into the groove 182 in order to hold the top portion of the strips in position and to provide exposed spring surfaces for mating with the respective terminals of the animal control device. Before the strips 184 and 186 are attached to the connector probe 152, an insulating washer 188 is positioned upon the base 166 of the probe 152. Strips 184 and 186 each include a horizontal projection which rests upon the washer 188. The bottom portion of the strips 184 and 186 is maintained in position against the exterior of the connector probe by compression of the horizontal projections between the washer 188 and the retaining member 170 when the retaining member 170 is securely bolted to base plate 174.

In order to ensure that the terminals 60, 62, and 64 align properly within the battery compartment of the animal control device when it is placed into the contoured receptacle 148, a key pin 190 (shown in FIG. 4) extends through the retaining member 170 into an alignment hole 192 in the base 166 of the connector probe 152.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A programming apparatus for a programmable animal control device having a receiver for receiving a radio signal, a transducer for applying a stimulus to an animal in response to the radio signal, and a programmable controller responsive to selected control parameters for controlling operation of the animal control device, the programming apparatus comprising:

a) parameter control means for storing control parameters and for providing said stored control parameters to the programmable controller;

b) a data communication link between the parameter control means and the programmable controller to permit data communication and transfer of control parameters therebetween; and c) parameter selection means for the parameter control means to enable the selection of control parameters, the parameter control means storing selected control parameters in response to the parameter selection means and being capable of providing the selected control parameters to the programmable controller of the animal control device via the data communication link to control operation of the animal control device in accordance with the selected control parameters.

2. The programming apparatus in accordance with claim 1 wherein one of the control parameters is frequency of operation of the receiver and wherein the parameter selection means includes a frequency selection input to enable selection of a control parameter corresponding to a desired frequency of operation.

3. The programming apparatus in accordance with claim 1 wherein the stimulus applied to the animal includes an electrical shock and wherein one of the control parameters is the frequency of application of the electrical shock, and wherein the parameter selection means includes a shock frequency input to enable selection of a control parameter corresponding to a desired shock frequency.

4. The programming apparatus in accordance with claim 1 wherein the stimulus applied to an animal includes an audible tone and an electrical shock and wherein one of the control parameters includes a time delay between application of the audible tone and application of the electrical shock, and wherein the parameter selection means includes a time-delay selection input to enable selection of a control parameter corresponding to a desired time delay between the application of the audible tone and the application of the electrical shock.

5. The programming apparatus in accordance with claim 1 comprising a display operably connected with the parameter control means to display control parameters stored by the parameter control means.

6. The programming apparatus in accordance with claim 1 wherein the data communication link includes a data line operably connectable between the parameter control means and the programmable controller of the animal control device.

7. The programming apparatus in accordance with claim 6 wherein the data line includes an output line to permit transfer of control parameters from the parameter control means to the programmable controller and an input line to permit transfer of control parameters from the programmable controller of the animal control device to the parameter control means.

8. The programming apparatus in accordance with claim 1 wherein said programming apparatus is portable and includes an internal power source.

9. The programming apparatus in accordance with claim 8 wherein the internal power source includes a battery and wherein the programming apparatus includes battery level detection circuitry for detecting the level of charge on the battery.

10. The programming apparatus in accordance with claim 8 comprising a power supply circuit for connecting the power source of the programming apparatus with the animal control device so that the power source of the programming apparatus supplies power to the animal control device during data communication and transfer of control parameters between the parameter control means and the programmable controller.

11. The programming apparatus in accordance with claim 8 comprising a first voltage regulator circuit for providing a first level of voltage for operation of the parameter control means and a second voltage regulator circuit for supplying a second level of voltage to the animal control device to operate the animal control device during data communication and transfer of control parameters between the parameter control means and the programmable controller of the animal control device.

12. The programming apparatus in accordance with claim 8 comprising a power-conservation circuit operably connected with the power source and the parameter control means for selectively supplying power within the programming apparatus.

13. The programming apparatus in accordance with claim 12 comprising a display operably connected with the parameter control means to display control parameters stored by the parameter control means and wherein the display is operably connected with the power-conservation circuit so that power is selectively supplied to the display under the control of the parameter control means.

14. The programming apparatus in accordance with claim 12 wherein the internal power source includes a battery and wherein the programming apparatus includes battery level detection circuitry for detecting the level of charge on the battery and wherein the battery level detection circuitry is operably connected with the power-conservation circuit so that power is selectively supplied to the battery level detection circuitry under the control of the parameter control means.

15. The programming apparatus in accordance with claim 12 including a voltage regulator circuit for supplying a selected level of voltage to the animal control device to operate the animal control device during data communication and transfer of control parameters between the parameter control means and the programmable controller of the animal control device and wherein the voltage regulator circuit is operably connected with the power-conservation circuit so that power is selectively supplied to the voltage regulator circuit under the control of the parameter control means.

16. A programming apparatus for a programmable animal control device having a receiver for receiving a radio signal, a transducer for applying a stimulus to an animal in response to the radio signal, and a programmable controller responsive to selected control parameters for controlling operation of the animal control device, the programming apparatus comprising:

a) parameter control means for storing control parameters and for providing said stored control parameters to the programmable controller;
  b) data communication link between the parameter control means and the programmable controller to permit data communication and transfer of control parameters therebetween;
  c) parameter selection means for the parameter control means to enable the selection of control parameters, the parameter control means storing selected control parameters in response to the parameter selection means and providing the selected control parameters to the programmable controller of the animal control device via the data communication link to control operation of the animal control device in accordance with the selected control parameters;
  d) a display operably connected with the parameter control means to display control parameters stored by the parameter control means;
  e) an internal power source; and
  f) a power supply circuit for operably connecting the power source of the programming apparatus with the animal control device so that the power source of the programming apparatus supplies power to the animal control device during data communication and transfer of control parameters between the parameter control means and the programmable controller.

17. The programming apparatus in accordance with claim 16 comprising a power-conservation circuit operably connected with the power source and the parameter control means for selectively supplying power within the programming apparatus.

18. The programming apparatus in accordance with claim 17 wherein the power-conservation circuit is operably connected with the display so that power is selectively supplied to the display under the control of the parameter control means.

19. The programming apparatus in accordance with claim 17 wherein the power-conservation circuit is operably connected with the power supply circuit so that power is selectively supplied to the power supply circuit under the control of the parameter control means.

20. The programming apparatus in accordance with claim 16 wherein one of the control parameters is frequency of operation of the receiver and wherein the parameter selection means includes a frequency selection input to enable selection of a control parameter corresponding to a desired frequency of operation and wherein further the stimulus applied to the animal includes an electrical shock and wherein one of the control parameters is the frequency of application of the electrical shock to the animal and wherein further the parameter selection means includes a shock frequency input to enable selection of a control parameter corresponding to a desired shock frequency.

21. An apparatus for altering the operation of an animal control device having a battery compartment and battery terminals and operating in accordance with a control parameter, comprising:

a) a connector probe for insertion into the battery compartment, said connector probe having probe terminals for mating with said battery terminals;
  b) a controller for establishing communication with said animal control device via said probe terminals and for receiving said control parameter for said animal control device;
  c) selection means for selecting a new value of said control parameter; and
  d) selection entry means for causing said controller to transmit said new value of said control parameter to said animal control device via said probe terminals.

* * * * *